United States Patent
Nakata

(10) Patent No.: US 10,983,673 B2
(45) Date of Patent: Apr. 20, 2021

(54) OPERATION SCREEN DISPLAY DEVICE, IMAGE PROCESSING APPARATUS, AND RECORDING MEDIUM

(71) Applicant: Konica Minolta, Inc., Tokyo (JP)

(72) Inventor: Masaki Nakata, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 153 days.

(21) Appl. No.: 16/419,517

(22) Filed: May 22, 2019

(65) Prior Publication Data

US 2019/0361574 A1 Nov. 28, 2019

(30) Foreign Application Priority Data

May 22, 2018 (JP) .............................. JP2018-097852

(51) Int. Cl.
*G06F 3/048* (2013.01)
*G06F 3/0482* (2013.01)
*G10L 15/22* (2006.01)
*G06F 3/16* (2006.01)

(52) U.S. Cl.
CPC ............ *G06F 3/0482* (2013.01); *G06F 3/167* (2013.01); *G10L 15/22* (2013.01)

(58) Field of Classification Search
None
See application file for complete search history.

(56) References Cited

U.S. PATENT DOCUMENTS

| 2011/0035671 | A1* | 2/2011 | Iwai | H04N 1/00347 715/728 |
| 2013/0179173 | A1* | 7/2013 | Lee | G10L 15/22 704/275 |
| 2014/0100850 | A1* | 4/2014 | Won | G06F 3/167 704/250 |
| 2014/0372892 | A1* | 12/2014 | Payzer | G10L 15/22 715/728 |
| 2018/0189027 | A1* | 7/2018 | Jeon | F25D 23/028 |

FOREIGN PATENT DOCUMENTS

JP 2006162691 A 6/2006

\* cited by examiner

*Primary Examiner* — Thanh T Vu
(74) *Attorney, Agent, or Firm* — Cantor Colburn LLP

(57) ABSTRACT

An operation screen display device includes: a display part; an operation part; and a processor that performs: making the display part display setting items for setting an operation condition of a job in an operation screen before starting the job; receiving a user manual input to specify one or more of the setting items from the operation part, the setting items being displayed in the operation screen; and receiving a user speech input to specify one or more of the setting items from a speech input device, the setting items being displayed in the operation screen. Upon receiving the user speech input, the processor makes the display part hide one or more of the setting items displayed in the operation screen, the one or more of the setting items being suitable for speech input.

21 Claims, 6 Drawing Sheets

| Setting Items | Initial Priority | Speech Configurability | Number of Times of Use | | History of Use | | | | |
|---|---|---|---|---|---|---|---|---|---|
| | | | Manual Input | Speech Input | 1 | 2 | 3 | 4 | 5 |
| Color | 1 | Yes | 50 | 150 | Speech Input | Speech Input | Speech Input | Panel Input | Speech Input |
| Number of Pages | 2 | Yes | 100 | 100 | Speech Input | Panel Input | Speech Input | Panel Input | Speech Input |
| Density | 3 | Yes | 20 | 40 | Speech Input | Speech Input | Panel Input | Panel Input | Panel Input |
| Finisher | 4 | Yes | 40 | 5 | Panel Input | Panel Input | Panel Input | Panel Input | Panel Input |
| Image Quality | 5 | Yes | 8 | 6 | Panel Input | Panel Input | Speech Input | Panel Input | Panel Input |
| Scale | 6 | Yes | 5 | 0 | Panel Input | Panel Input | Panel Input | Panel Input | Panel Input |
| Layout | 7 | Yes | 3 | 0 | Panel Input | Panel Input | Panel Input | Panel Input | — |
| Security | 8 | No | 2 | 0 | — | — | — | — | — |
| ID Card Copy | 9 | Yes | 0 | 0 | — | — | — | — | — |

FIG.6

OPERATION SCREEN DISPLAY DEVICE, IMAGE PROCESSING APPARATUS, AND RECORDING MEDIUM

CROSS REFERENCE TO RELATED APPLICATION

The present application claims priority under 35 U.S.C. § 119 to Japanese Patent Application No. 2018-097852 filed on May 22, 2018, including description, claims, drawings, and abstract, is incorporated herein by reference in its entirety.

BACKGROUND

Technological Field

The present invention relates to: an operation screen display device capable of displaying operation screens for the setting of an operation condition of a job to be executed by an image processing apparatus, for example; an image processing apparatus provided with this operation screen display device; and a recording medium.

Description of the Related Art

Conventional multifunctional digital machines referred to as multifunction peripherals (MFP) are image processing apparatuses, for example. Such an image processing apparatus allows the user to input a value for the setting of a job manually from an operation panel of the image processing apparatus or an external terminal apparatus and also to do the same by speech via a speech input device such as a microphone.

Speech input is an intuitive method of operation; the user does not have to move between operation screens by moving up and down a level in the screen hierarchy and thus can get it done quickly.

However, the user would feel difficulty with speech input when he/she has no idea what to speak or has to input various values for a function by speech.

When the user feels difficulty with speech input, he/she can also choose manual input, an input method using the operation panel or another operation part, rather than speech input. With this point as background, there is a need for technology to make the user interface match manual input or speech input according to situation.

Japanese Unexamined Patent Application Publication No. 2009-162691 discloses a vehicle-installed information terminal that allows the user to recognize a speech-configurable function quickly from the menu. The vehicle-installed information terminal is provided with: a display that displays multiple operation buttons and multiple functions that are configurable manually using the operation buttons; a display processor that controls the contents on the display; and a speech input device. The functions that are configurable manually using the operation buttons include: a first category function that is also configurable by speech via the speech input device; and a second category function that is not configurable by speech via the speech input device. The display processor displays the first and second category function in different manners so that the user can distinguish between them.

Although this technique allows the user to distinguish between a speech-configurable function and a non-speech-configurable function quickly, it does not make the user interface match manual input or speech input according situation, leaving the problem still unsolved.

SUMMARY

The present invention, which has been made in consideration of such a technical background as described above, is capable of making the user interface match manual input or speech input according to situation when the user configures the setting of a job.

A first aspect of the present invention relates to an operation screen display device including:
  a display part;
  an operation part; and
  a processor that performs:
   making the display part display one or a plurality of setting items for setting an operation condition of a job in an operation screen before starting the job;
   receiving a user manual input for one or more of the setting items from the operation part, the setting items being displayed in the operation screen; and
   receiving a user speech input for one or more of the setting items from a speech input device, the setting items being displayed in the operation screen, wherein, upon receiving the user speech input, the processor makes the display part hide one or more of the setting items displayed in the operation screen, the one or more of the setting items being suitable for speech input.

A second aspect of the present invention relates to a non-transitory computer-readable recording medium storing a program for execution by a computer of an operation screen display device including a display part and an operation part, the program allowing the computer to execute:
   making the display part display one or a plurality of setting items for setting an operation condition of a job in an operation screen before starting the job;
   receiving a user manual input to specify one or more of the setting items from the operation part, the setting items being displayed in the operation screen; and
   receiving a user speech input to specify one or more of the setting items from a speech input device, the setting items being displayed in the operation screen, wherein, upon receiving the user speech input, the processor makes the display part hide one or more of the setting items displayed in the operation screen, the one or more of the setting items being suitable for speech input.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is an example of an activity log table of a user, which is stored on a storage device.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
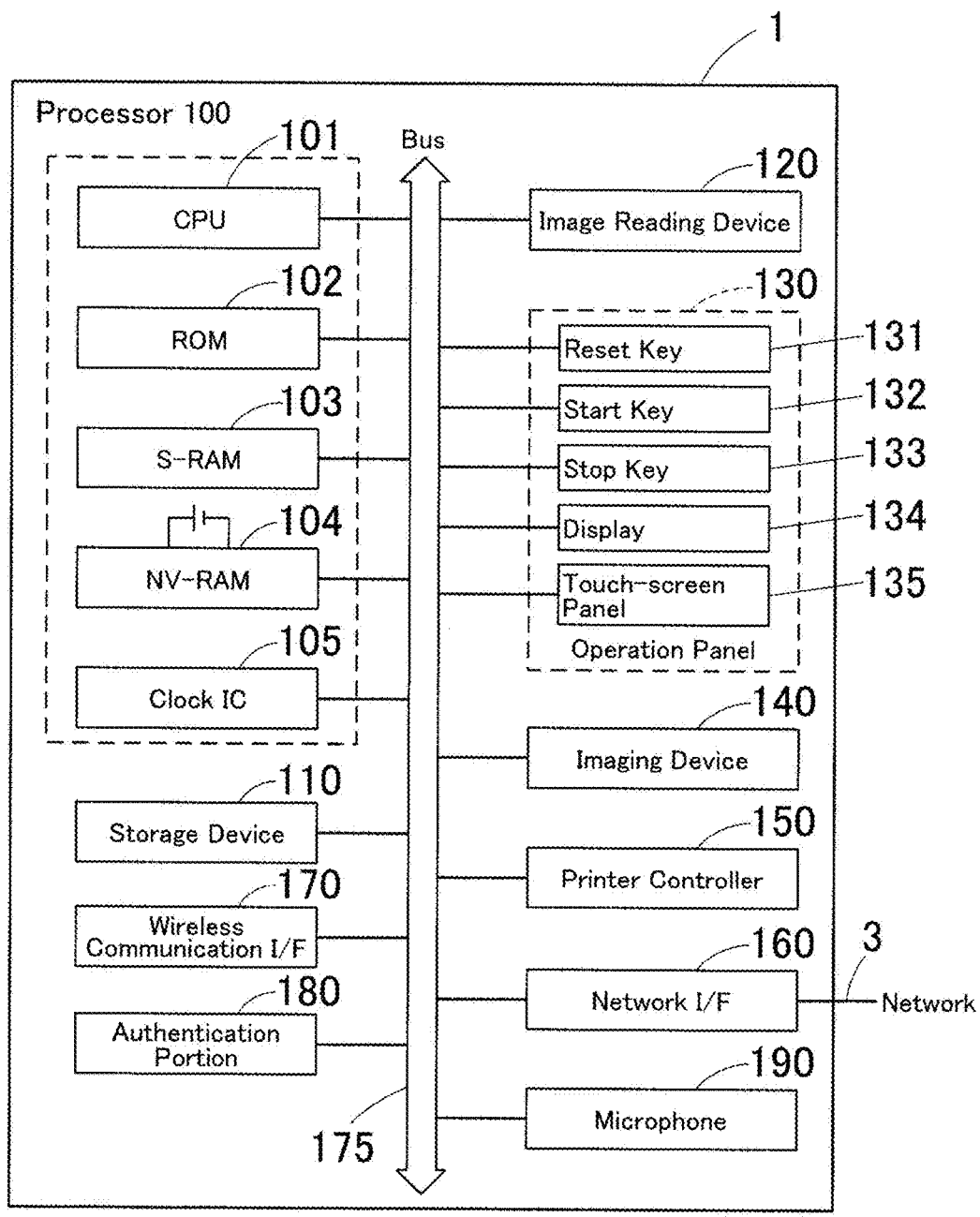
FIG. 1 is a block diagram illustrating a configuration of an image forming apparatus as an image processing apparatus provided with an operation screen display device according to one embodiment of the present invention.

FIG. 1 is a block diagram illustrating a configuration of an image forming apparatus 1 as an image processing apparatus provided with an operation screen display device according to one embodiment of the present invention. In this embodiment, an MFP i.e. a multi-functional digital machine having various functions such as a copier function, a printer function, a scanner function, and a facsimile function, as described above, is employed as the image forming apparatus 1. Hereinafter, an image forming apparatus will be also referred to as "MFP".

As illustrated in FIG. 1, the MFP 1 is essentially provided with a processor 100, a storage device 110, an image reading device 120, an operation panel 130, an imaging device 140, a printer controller 150, a network interface (network I/F) 160, a wireless communication interface (wireless communication I/F) 170, an authentication part 180, and a microphone 190, all of which are connected to each other through a system bus 175.

The processor 100 is essentially provided with a central processing unit (CPU) 101, a read-only memory (ROM) 102, a static random access memory (S-RAM) 103, a non-volatile random access memory (NV-RAM) 104, and a clock IC 105.

The CPU 101 controls the MFP 1 in a unified and systematic manner by executing programs stored on a recording medium such as the ROM 102. Specifically, the CPU 101 controls the MFP 1 in such a manner that allows the MFP 1 to execute its copier, printer, scanner, facsimile, and other functions successfully. The CPU 101 also receives a user manual input from the operation panel 135, and configures the setting of a job as instructed by the user. Furthermore, in this embodiment, the CPU 101 receives a user speech input from the microphone 190 when speech input mode is on. Subsequently, the CPU 101 analyzes the user speech input using a publicly-known speech recognition technology, configures the setting of a job as instructed by the user, and edits the contents of an operation screen displayed on the display 134 of the operation panel 130. These operations will be later described more in detail.

The ROM 102 stores programs to be executed by the CPU 101 and other data.

The S-RAM 103 serves as a workspace for the CPU 101 to execute a program and essentially stores a program and data to be used by the program for a short time.

The NV-RAM 104 is a battery backed-up non-volatile memory and essentially stores various settings related to image forming.

The clock IC 105 indicates time and also serves as an internal timer to measure an execution time, for example.

The storage device 110 is a hard disk drive, for example, and stores programs and other data of various types. Furthermore, in this embodiment, the storage device 110 stores an activity log table about every user; the activity log table records a value input by the user for the setting of a job, an input method used by the user, a setting item specified by the user, and other activity log information.

The image reading device 120 is essentially provided with a scanner. The image reading device 120 obtains an image by scanning a document put on a platen and converts the obtained image to an image data format.

The operation panel 130 serves as an operation part, allowing the user to give a job and instructions to the MFP 1 and configure the setting of various functions of the MFP 1. The operation panel 130 107 is essentially provided with a reset key 131, a start key 132, a stop key 133, a display 134, and a touch-screen panel 135.

The reset key 131 allows the user to reset the settings. The start key 132 allows the user to start operation, for example, start scanning. The stop key 133 allows the user to stop operation.

The display 134 consists of a liquid-crystal display device, for example, and displays messages, various operation screens, and other information. The touch-screen panel 135 is mounted on the surface of the display 134 and detects user touch events.

The imaging device 140 makes a physical copy by printing on paper image data obtained from a document by the image reading device 120 and an image formed on the basis of print data received from a terminal apparatus 4.

The printer controller 150 forms an image on the basis of print data received by the network interface 160.

The network interface 160 serves as a transmitter-receiver means that exchanges data through a network 3. The wireless communication interface 170 is an interface to communicate with external apparatuses using near-field wireless communication technology.

The authentication part 180 obtains identification information of a user trying to log on and performs authentication by comparing the identification information to proof information stored on a recording medium such as the storage device 110. Instead of the authentication part 180, an external authentication server may compare the identification information to the proof information. In this case, the authentication part 180 performs authentication by receiving a result of the authentication from the authentication server.

The microphone 190 serves as a speech input device, allowing the user to input a speech.

Figure 2:
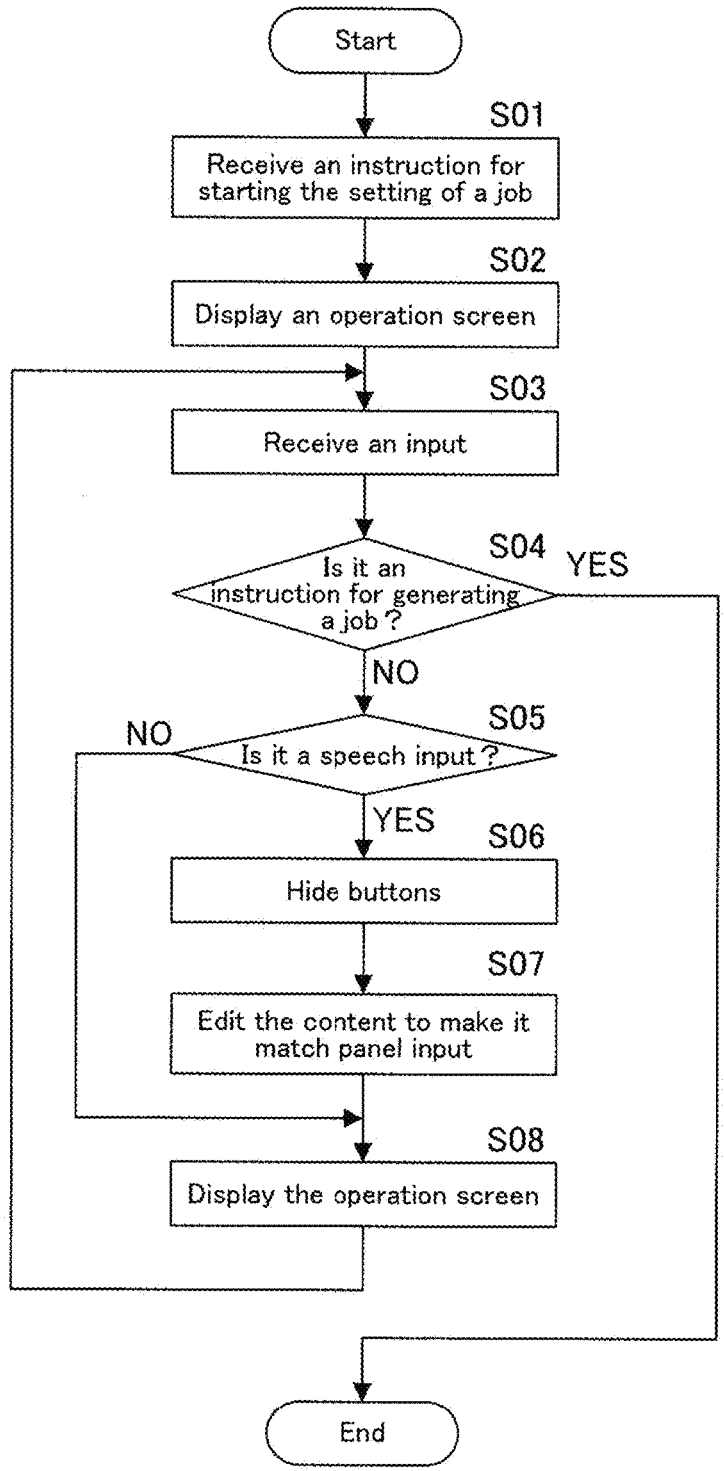
FIG. 2 is a flowchart for reference in describing operations of the image processing apparatus, which starts when the user specifies one or more setting items for setting an operation condition of a job.

FIG. 2 is a flowchart for reference in describing operations of the MFP 1, which starts when the user specifies one or more setting items for setting an operation condition before starting a print job, for example. The operation represented by the FIG. 2 flowchart is executed by the CPU 101 of the MFP 1 in accordance with an operation program stored on a recording medium such as the ROM 102.

In this embodiment, the MFP 1 is configured to receive a manual input (hereinafter, to be also referred to as "panel input") from the operation panel 130 and a speech input via the microphone 190. When the MFP 1 starts up and when the MFP 1 operates in normal mode, speech input mode is off and only panel input is enabled. When speech input mode is on, both panel input and speech input are enabled. In speech input mode, the user can choose panel input or speech input freely according to situation.

In this example, the user turns on speech input mode by turning on the microphone 190 or by pressing a speech input button in the operation screen; a method for turning on speech input mode, however, should not be limited to the example. Alternatively, the MFP 1 may mechanically turn on speech input mode upon detecting a speech input.

After falling to sleep mode in speech input mode, the MFP 1, including the operation panel 130, wakes up from sleep mode and starts operating in speech input mode. So, the user can start with panel input or speech input, whichever he/she prefers.

In Step S01, an instruction for starting the setting of a job is received. In this example, speech input mode is on and thus both panel input and speech input are enabled. The user may give an instruction for starting the setting of a job manually from the operation panel 130 or by speech. The MFP 1 may require the user be authenticated; in this case, the authentication part 180 conducts user authentication. The authentication part 180 conducts user authentication using necessary information that is input manually from the operation panel 130. Alternatively, the authentication part 180 may conduct user authentication by conducting speaker identification using a user speech input.

In Step S02, an initial menu screen with one or more setting items (setting buttons) is displayed on the display 134. In Step S03, a user input is received.

Figure 3:
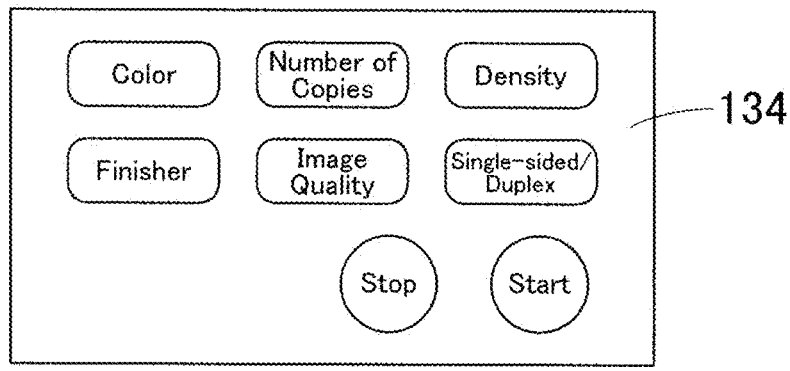
FIG. 3 illustrates an example of an initial menu screen.

FIG. 3 illustrates an example of an initial menu screen. This initial menu screen also serves for panel input, having setting buttons for color, number of copies, density, finisher, image quality, and single-sided/duplex, as well as a start button and a stop button. The finisher setting button serves for the setting of stapler, hole punch, and other finishers.

In Step S04, it is judged whether or not the user input is an instruction for generating a job. If it is not an instruction for generating a job (NO in Step S04), it is further judged in Step S05 whether or not the user input is a user speech input. If it is a user speech input (YES in Step S05), setting buttons for the functions suitable for speech input are hidden from the operation screen in Step S06. In Step S07, the user input is reflected and the contents of the operation screen are edited such that it has only setting buttons for the functions suitable for panel input. In Step S08, the operation screen with the edited contents is displayed on the display 134. Then the routine returns to Step S03.

If another user input is received in Step S03 and it is a user speech input (YES in Step S05), the setting buttons for the functions suitable for speech input are hidden from the operation screen in Step S06. As described above, the setting buttons for the functions suitable for speech input are hidden every time a user speech input is received.

In Step S05, if the user input is not a user speech input (NO in Step S05), the user input is reflected and an operation screen for panel input, including the setting buttons for the functions suitable for speech input, is displayed on the display 134 in Step S08. This initial menu screen has setting buttons for the functions suitable for speech input. Then the routine returns to Step S03.

Alternatively, an operation screen for panel input, including the setting buttons for functions suitable for speech input, may be displayed on the display 134 when a user manual input is received serially right after a user speech input. This is a reasonable configuration too, because the receipt of a serial user manual input right after a user speech input highly possibly means that the user will continue with manual input.

In Step S04, if the user input is an instruction for generating a job (YES in Step S04), the routine terminates. Then the MFP 1 generates a job including the set values.

Figure 4:
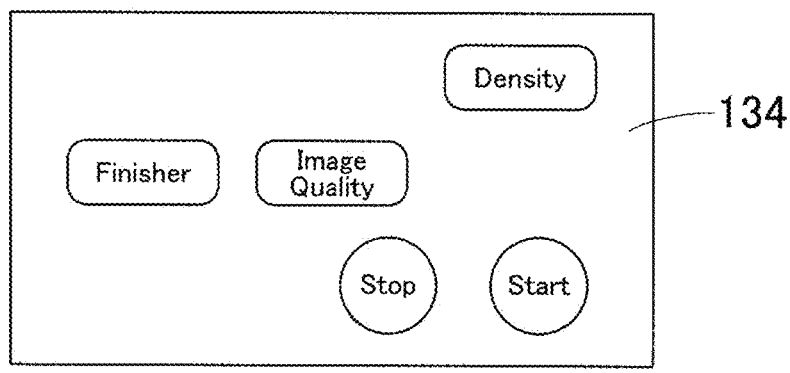
FIG. 4 illustrates an example of an operation screen after the setting items suitable for speech input are hidden.
Figure 5:
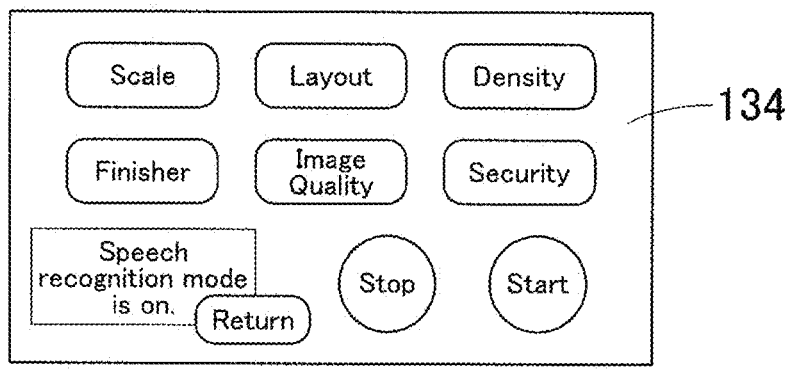
FIG. 5 illustrates an example of an operation screen after the setting items suitable for panel input are displayed as replacements for the hidden setting items.

FIG. 4 illustrates an example of an operation screen after setting buttons for the functions suitable for speech input are hidden. When the user input received in Step S03 is a user speech input for color, setting buttons for the functions suitable for speech input i.e. color, number of copies, and single-sided/duplex are hidden from the initial menu screen of FIG. 3, and thus the operation screen of FIG. 4 is displayed. As replacements for these buttons, setting buttons for the functions suitable for panel input i.e. scale, layout, and security appear, and thus the operation screen of FIG. 5 is displayed. In this operation screen, a return button and a message stating that speech recognition mode (speech input mode) is currently on also appear. When the user presses the return button, an operation screen for panel input is displayed again.

Each setting item suitable for panel input is a setting item requiring a value be input from an illustration, a setting item requiring various values be input, or a setting item requiring a value of many digits be input, for example. Staple can be a setting item requiring a location be pointed out from an illustration. Layout can be a setting item requiring various values e.g. "portrait" for orientation and "4 in 1" for pages per sheet be input.

When the user starts with speech input or when speaker identity proves that the user is authenticated, an operation screen having only setting items suitable for panel input may be displayed instead of the initial menu screen shown in FIG. 3.

In the example of FIG. 5, the setting items suitable for panel input i.e. scale, layout, and security appear as replacements of the hidden ones and these are displayed at the same positions in the same sizes as the hidden ones. For a better visibility, these setting items may be displayed at different positions in different sizes from the hidden ones. Alternatively, the setting items suitable for panel input may not appear; for a better visibility, in this case, the remaining setting items are displayed at different positions in different sizes from themselves before.

Yet alternatively, setting buttons related to the setting items specified by the user speech input may appear in the operation screen in order of priority, as replacements of the hidden ones. Still yet alternatively, setting buttons subordinate to the setting item specified by the user speech input may appear in the operation screen in order of priority, as replacements of the hidden ones. For example, tone is a setting item subordinate to color that is configurable using a user speech input and gutter length is a setting item subordinate to gutter that is configurable using a user speech input.

Furthermore, the MFP 1 may determine setting items suitable for panel input and setting items suitable for speech input with reference to activity log information. In this case, the storage device 110 stores a setting item and an input method used for specifying the setting item in one record and the MFP 1 refers to the records when the user configures the setting of a job. To display an operation screen suitable for panel input, for example, the MFP 1 hides setting item having ever been specified using a user speech input, in order of priority, with reference to the activity log information. If any of the setting item is a setting item having been specified using a user manual input right after being specified using a user speech input, the MFP 1 never hides the setting item but overwrites the record stored on the storage device 110. After hiding the setting items, the MFP 1 may display setting items having ever been specified using a user manual input, in order of priority. In this case, if any of the setting items is a setting item having been specified using a user speech input right after being specified using a user manual input, the MFP 1 never displays the setting item but overwrites the record stored on the storage device 110.

Alternatively, the MFP 1 may customize the contents of the operation screen and the initial menu screen for each user. In this case, the storage device 110 stores an activity log table, as shown in FIG. 6, about every user.

In the activity log table of FIG. 6, there are records about color, number of copies, finisher, and other setting items and one record contains default values about priority, speech-configurable/non-speech-configurable, and other subjects. Priority is the priority assigned to the setting item for display when the user input is not a user speech input.

One record further contains the number of times the setting item has ever been specified using a user panel input (the number of times a user panel input has ever been received), the number of times the setting item has ever been specified using a user speech input (the number of times a user speech input has ever been received), and a user input history. The user input history is composed of a certain number of input methods (five input methods in the example of FIG. 6) most recently used for setting item. Depending on the capacity of the storage device 110, the user input history may be composed of all input methods having ever been used for the setting item. Although not shown in this table, one record may further contain a setting order based on the setting item specified by a user speech input and a setting order based on the setting item specified by a user panel input.

As described above, the MFP 1 creates an operation screen with reference to the activity log table of FIG. 6, and displays it on the display 134. When speech input mode is off, the MFP 1 displays setting buttons suitable for panel input and suitable for speech input, all together in an operation screen. To avoid this, the MFP 1 may display setting buttons having been specified most, in descending order.

When the user turns on speech input mode and starts with speech input, the MFP 1 edits the contents of the operation screen such that it has only setting buttons suitable for panel input by hiding setting buttons suitable for speech input from the operation screen. After hiding the setting buttons, the MFP 1 may display setting buttons having been most specified using a user panel input, for example, in order of priority. In this case, if any of the setting items having been most specified using a user panel input is a setting item having been specified more times using a user speech input than using a user panel input, the MFP 1 never displays a setting button. Alternatively, the MFP 1 may hide setting buttons having been sequentially specified multiple times using a user speech input, then display setting buttons having been sequentially specified multiple times using a user panel input, in order of priority.

When the user starts with speech input, it is desirable that the MFP 1 display the non-speech-configurable setting items in an initial menu screen, in order or priority.

Figure 7:
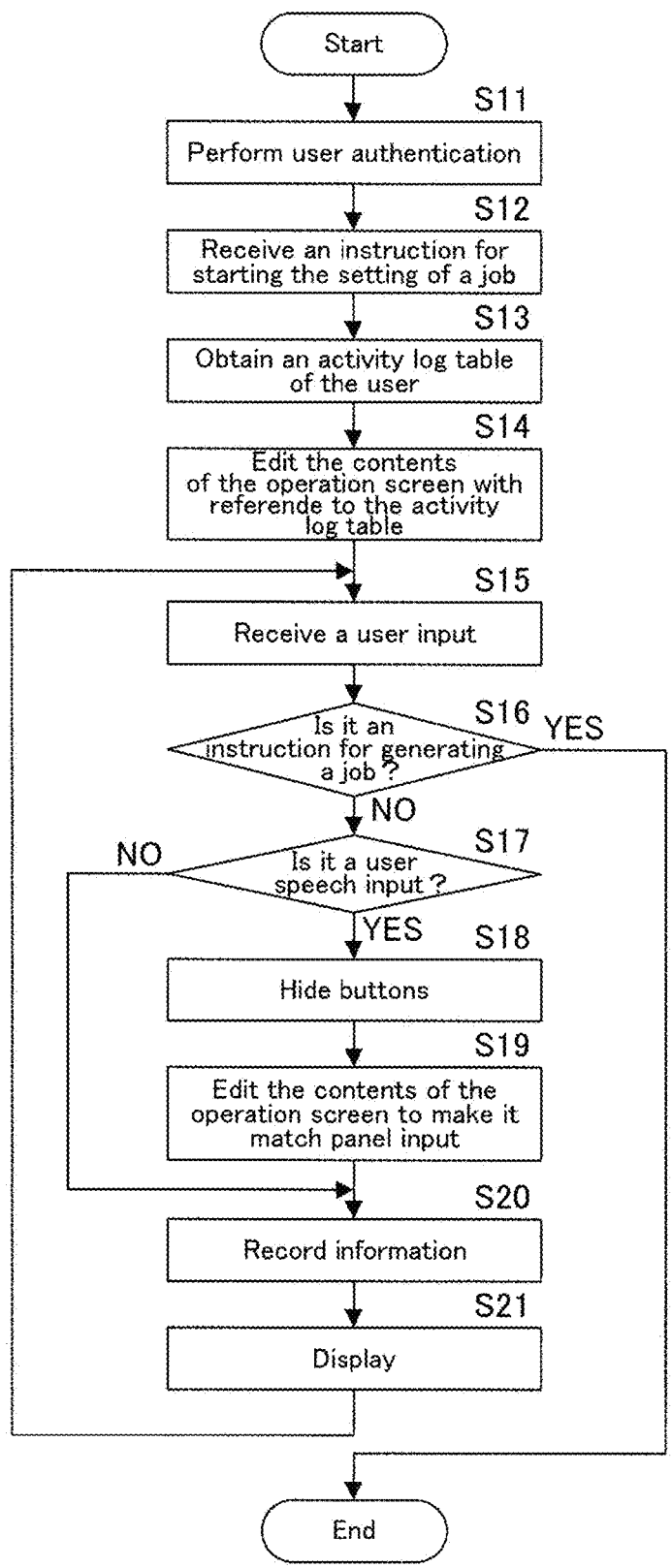
FIG. 7 is a flowchart for reference in describing how the image forming apparatus customizes an operation screen, which starts when the user specifies one or more setting items for setting an operation condition of a job.

FIG. 7 is a flowchart for reference in describing how the image forming apparatus customizes an operation screen, which starts when the user specifies one or more setting items for setting an operation condition of a print job, for example. The operation represented by the FIG. 7 flowchart is executed by the CPU 101 of the MFP 1 in accordance with an operation program stored on a recording medium such as the ROM 102.

In Step S11, user authentication is performed and thus the user is identified. In Step S12, an instruction for starting the setting of a job is received. In Step S13, an activity log table of the user (shown in FIG. 6) is obtained from the storage device 110. In Step S14, the contents of the operation screen are edited with reference to the activity log table and the operation screen with the edited contents is displayed.

In Step S15, a user input is received. In Step S16, it is judged whether or not the user input is a user instruction for generating a job. If it is not an instruction for generating a job (NO in Step S16), it is further judged in Step S17 whether or not the user input is a user speech input. If it is a user speech input (YES in Step S17), setting items suitable for speech input are determined with reference to the activity log table and determined setting items are hidden from the operation screen in Step S18. In Step S19, the user input is reflected and the contents of the operation screen are edited such that it has only setting buttons suitable for panel input, with reference to the activity log table. Then the routine proceeds to Step S20.

In Step S17, if the user input is not a user speech input (NO in Step S17), the routine proceeds to Step S20.

In Step S20, the setting items having just been specified and the input method having just been used are recorded in the activity log table of the user. In Step S21, the operation panel is displayed on the display 134. Then the routine returns to Step S15. If the user input is a user panel input, the user input is reflected and an operation screen for panel input is displayed on the display 134.

In Step S16, if the user input is an instruction for generating a job (YES in Step S16), the routine terminates. Then the MFP 1 generates a job including the set values.

Figure 8:
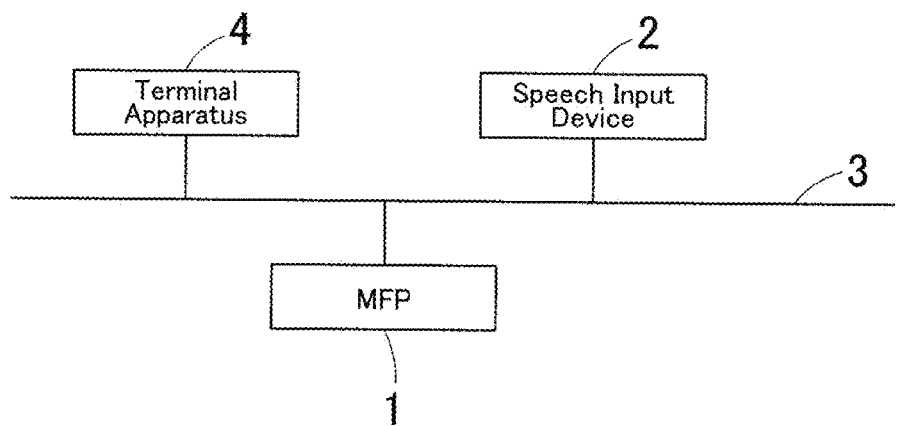
FIG. 8 illustrates another embodiment of the present invention.

While one embodiment of the present invention has been described in detail herein, it should be understood that the present invention is not limited to this embodiment. For example, in the above-described embodiment, the MFP 1 is provided with the operation screen display device. Instead of the MFP 1, a terminal apparatus 4 may be provided with the operation screen display device, as illustrated in FIG. 8. The terminal apparatus 4 must be an information processing apparatus capable of: synchronizing an operation screen on its display with that of the MFP 1 by a printer driver or another application; allowing the user to operate the MFP 1 using an operation part; and transferring a user input for the setting of a job and a user instruction for staring the job to the MFP 1 through the network 3. The terminal apparatus 4 is a desktop computer, a laptop computer, a tablet computer, or a smartphone, for example.

The terminal apparatus 4 receives a user speech input via a speech input device 2 and edits the contents of an operation screen displayed on the display, in the same manner as the MFP 1.

Furthermore, the speech input device 2 may be provided in the MFP 1 or the terminal apparatus 4. Alternatively, the speech input device 2 may be provided independently of the MFP 1 or the terminal apparatus 4. In this case, the speech input device 2 transfers a user speech input to the MFP 1 or the terminal apparatus 4 through the network 3.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An operation screen display device comprising:
a display part;
an operation part; and
a processor that performs:
making the display part display one or a plurality of setting items for setting an operation condition of a job in an operation screen before starting the job;
receiving a user manual input to specify one or more of the setting items from the operation part, the setting items being displayed in the operation screen; and
receiving a user speech input to specify one or more of the setting items from a speech input device, the setting items being displayed in the operation screen,
wherein, upon receiving the user speech input, the processor makes the display part hide one or more of the setting items displayed in the operation screen, the one or more of the setting items being suitable for speech input.

2. The operation screen display device according to claim 1, wherein, after the one or more setting items suitable for speech input are hidden, the processor makes the display part display a remaining setting item at a different position in the operation screen.

3. The operation screen display device according to claim 2, wherein the processor further makes the display part display the remaining setting item in a different size in the operation screen.

4. The operation screen display device according to claim 2, wherein the processor further makes the display part display one or more setting items in order of priority, the one or more setting items being related to the setting item specified by the user speech input.

5. The operation screen display device according to claim 4, wherein the one or more setting items being related to the setting item specified by the user speech input is one or more setting items being subordinate to the setting item specified by the user speech input.

6. The operation screen display device according to claim 1, wherein, after the one or more setting items suitable for speech input are hidden, the processor makes the display part display one or more setting items suitable for manual input in the operation screen as replacements for the one or more hidden setting items.

7. The operation screen display device according to claim 6, wherein each setting item suitable for manual input is a setting item requiring a value be input from an illustration, a setting item requiring various values be input, or a setting item requiring a value of many digits be input.

8. The operation screen display device according to claim 1, further comprising a second memory that stores the setting item specified by the user speech input received by the processor, wherein the processor makes the display part hide one or more of the setting items stored on the second memory.

9. The operation screen display device according to claim 8, wherein, if any of the one or more setting items stored on the second memory is specified by the user manual input right after being specified by the user speech input, the processor makes the display part never hide the any setting item.

10. The operation screen display device according to claim 1, comprising a first memory that stores the setting item specified by the user manual input received by the processor, wherein the processor makes the display part display one or more setting items stored on the first memory in the operation screen, in order of priority.

11. The operation screen display device according to claim 10, wherein, if any of the one or more setting items stored on the first memory is specified by the user speech input right after being specified by the user manual input, the processor makes the display part never display the any setting item.

12. The operation screen display device according to claim 1, wherein, upon start-up of the operation screen display device, the processor makes the display part display setting items in an operation screen, the setting items being suitable for manual input.

13. The operation screen display device according to claim 12, wherein, after falling to sleep mode in speech input mode, the operation screen display device wakes up from sleep mode and starts operating in speech input mode.

14. The operation screen display device according to claim 1, wherein, on every receipt of the user speech input, the processor makes the display part hide one or more of the setting items displayed in the operation screen, the one or more of the setting items being suitable for speech input.

15. The operation screen display device according to claim 1, wherein, upon receipt of the serial user manual input right after the user speech input, the processor makes the display part never hide one or more of the setting items displayed in the operation screen, the one or more of the setting items being suitable for speech input.

16. The operation screen display device according to claim 1, wherein the processor further customizes the operation screen displayed on the display part.

17. The operation screen display device according to claim 16, wherein the operation screen displayed on the display part is an initial menu screen.

18. The operation screen display device according to claim 16, wherein, the operation screen displayed on the display part is the operation screen displayed on the display part upon the receipt of the user speech input by the processor.

19. The operation screen display device according to claim 16, further comprising a third memory that stores information about every user, wherein:
the processor customizes the operation screen with reference to the information stored on the third memory, the operation screen being displayed on the display part; and
the information about every user stored on the third memory is at least one of:
the setting item specified by the user speech input received by the processor;
a setting order based on the setting item specified by the user speech input received by the processor;
the number of times the setting item has ever been specified by the user speech input received by the processor;
the setting item specified by the user manual input received by the processor;
a setting order based on the setting item specified by the user manual input received by the processor; and
the number of times the setting item has ever been specified by the user manual input received by the processor.

20. An image processing apparatus comprising the operation screen display device according to claim 1.

21. A non-transitory computer-readable recording medium storing a program for execution by a computer of an operation screen display device comprising a display part and an operation part, the program allowing the computer to execute:

making the display part display one or a plurality of setting items for setting an operation condition of a job in an operation screen before starting the job;

receiving a user manual input to specify one or more of the setting items from the operation part, the setting items being displayed in the operation screen; and receiving a user speech input to specify one or more of the setting items from a speech input device, the setting items being displayed in the operation screen, wherein, upon receipt of the user speech input, the program allows the computer make the display part hide one or more of the setting items displayed in the operation screen, the one or more of the setting items being suitable for speech input.

* * * * *